UNITED STATES PATENT OFFICE.

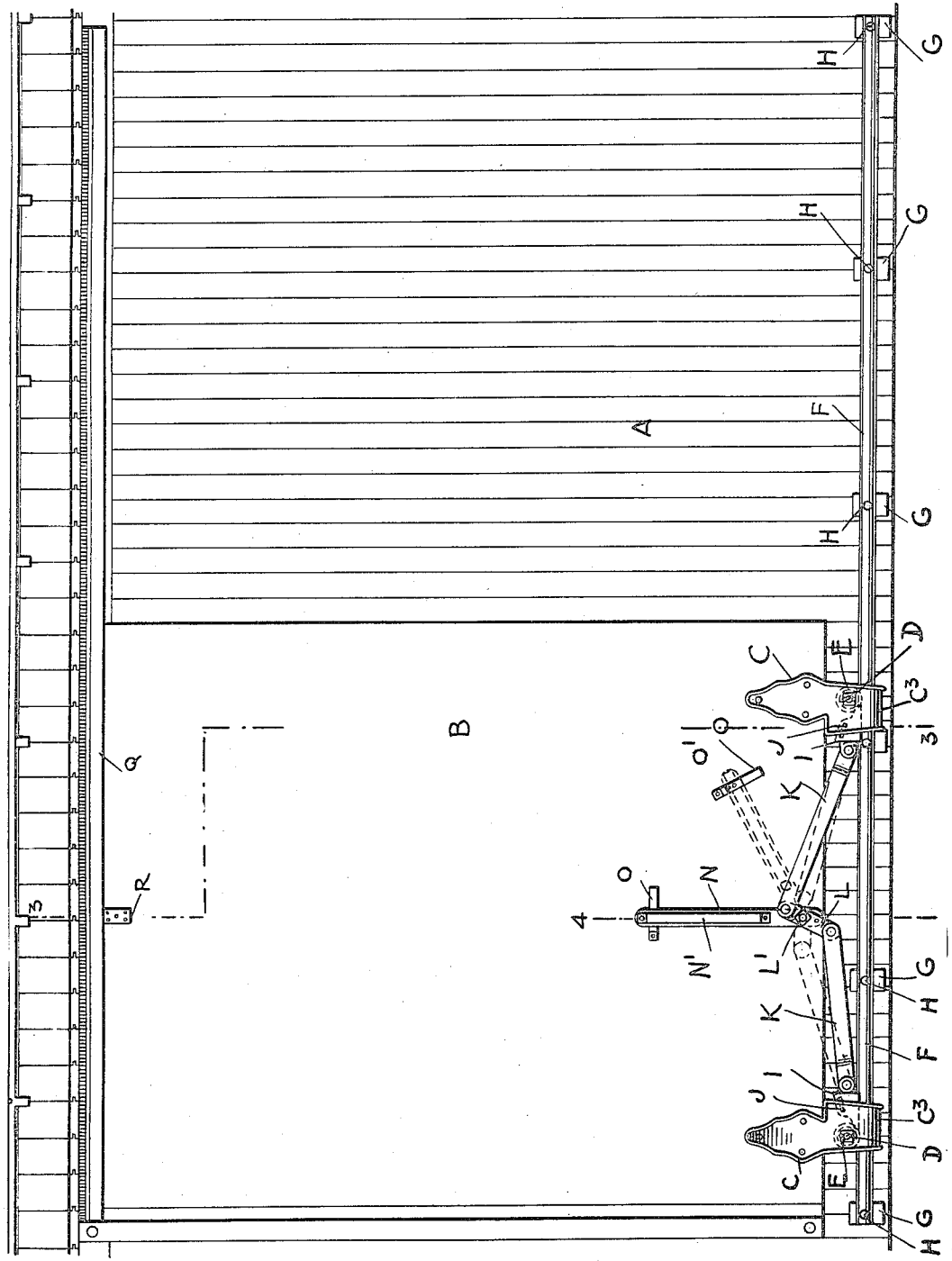

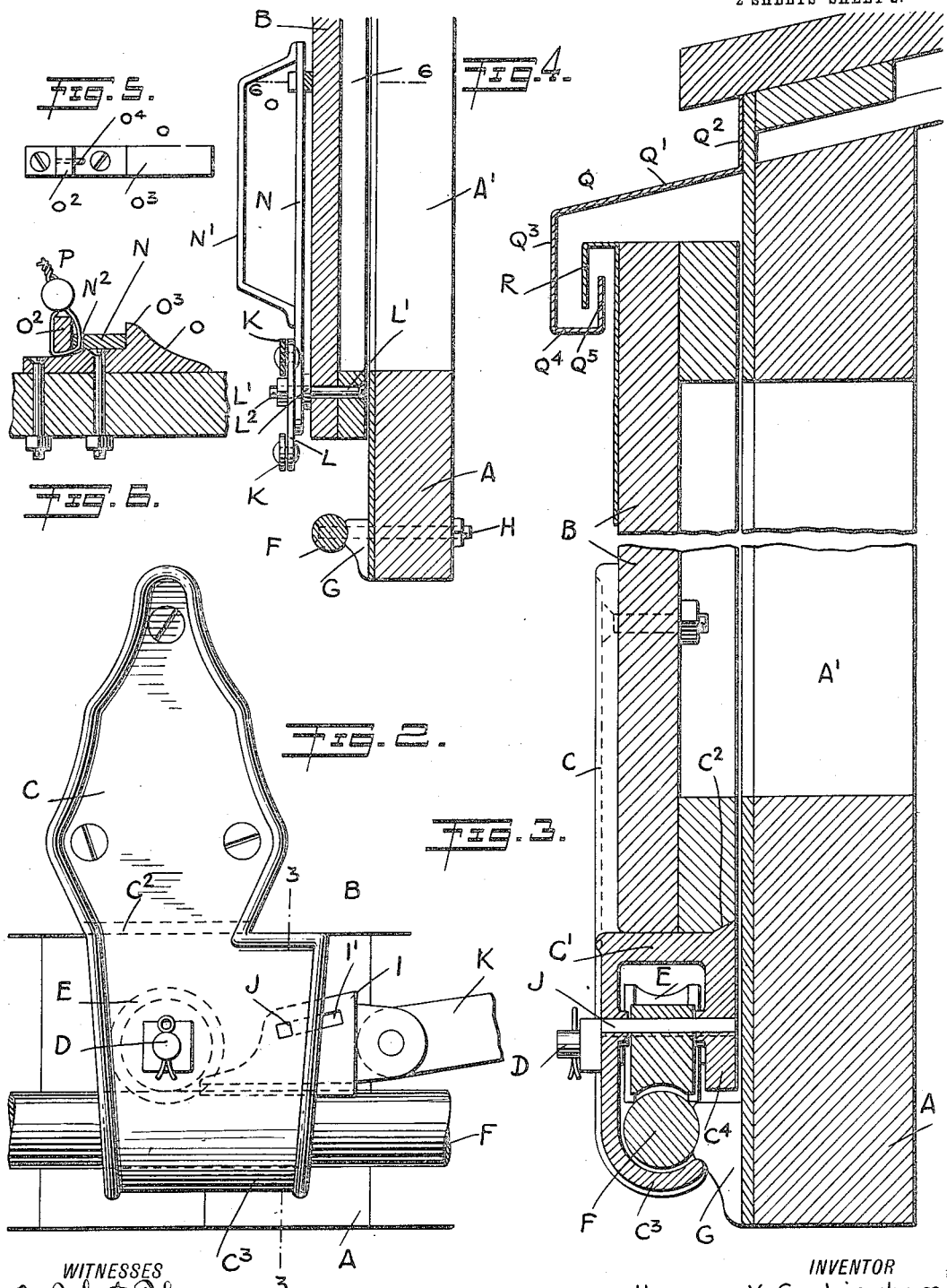

HERMAN V. COOKINGHAM, OF RENSSELAER, AND GEORGE O. PRICE, OF ALBANY, NEW YORK.

SLIDING-DOOR LOCK.

1,042,326.

Specification of Letters Patent.   Patented Oct. 22, 1912.

Application filed May 22, 1912. Serial No. 698,903.

*To all whom it may concern:*

Be it known that we, HERMAN V. COOKINGHAM and GEORGE O. PRICE, citizens of the United States, and residents, respectively, of Rensselaer, in the county of Rensselaer and State of New York, and Albany, in the county of Albany and State of New York, have invented a new and Improved Sliding-Door Lock, of which the following is a full, clear, and exact description.

The object of the invention is to provide a lock for sliding doors of freight cars of the box or furniture type, improved in certain respects to be hereinafter apparent.
For the purpose mentioned, use is made of a track arranged on the side of the car, hangers fastened to the car door and provided with hooks engaging the said track, rollers journaled on the said hangers and mounted to travel on the said track, and manually-controlled wedges adapted to be forced between the rollers and the track to firmly engage the hanger hooks with the track and thus lock the door securely in open, closed or partly open position.

A practical embodiment of the invention is represented in the accompanying drawings forming a part of this specification, in which similar characters of reference indicate corresponding parts in all the views.

Figure 1 is a side elevation of a car body provided with the improved door in closed position; Fig. 2 is an enlarged side elevation of one of the hangers in position on the supporting track and a corresponding locking device; Fig. 3 is an enlarged cross section of the car door as applied to the car body, the section being on the line 3—3 of Fig. 1; Fig. 4 is a similar view of the same on the line 4—4 of Fig. 1; Fig. 5 is an enlarged face view of one of the keepers for the locking lever; and Fig. 6 is an enlarged sectional plan view of the locking lever and keeper as applied to the car door, the section being on the line 6—6 of Fig. 4.

The car body A is provided on each side with the usual door opening A' adapted to be opened or closed by a door B provided at its lower end with two spaced hangers C each carrying a bolt D forming an axle for a wheel or a roller E to turn on, the said wheel being grooved and engaging the top of a bottom track F, preferably of cylindrical shape. The track F rests against blocks or brackets G and the track is engaged by transversely-extending bolts H also passing through the blocks G and the sill of the car body A, to securely fasten the track F in place on the car body, as will be readily understood by reference to Figs. 1, 3 and 4. The heads of the bolts H are preferably countersunk in the track F so as to form no undesirable projections on the track F. Each of the hangers C is wider in its lower portion and is provided at its back with a transversely-extending flange C' (see Fig. 3) on which rests the lower edge of the door B, and the rear end of the flange C' is provided with an upturned ledge C² for engaging the side lower corner of the door so as to relieve the latter of undue side strain when opening or closing the door B. From the lower end of the edge of hanger C depends a downwardly and inwardly-extending safety locking hook C³ engaging the under side of the track F so as to prevent the wheel or roller E from leaving the track F on opening or closing the door. From the rear end of the flange C' depends a lug C⁴ forming with the hanger C a support for the bolt D. It will be seen that by the arrangement described the wheel E is well protected against injury as it is arranged between the hanger C and the lug C⁴ and is covered on top by the flange C'.
The wheels E of the two hangers C are adapted to be engaged at their peripheral faces by wedges I having grooved bottoms adapted to engage the top of the track F, the said wedges being adapted to be moved between the wheels E and the track F so as to slightly raise the car door B and with it the hanger C to firmly engage the hooks C³ with the track F with a view to securely lock the car door B in a closed, open or partly open position, that is, the door can be locked in any position along the track F. Each wedge I extends between the corresponding hanger C and its lug C⁴ (see Fig. 3). The wedge is provided with an inclined slot I' through which extends a pin J held in the hanger C and its lug C⁴. The wedges I of the two hangers are connected by links K with the ends of the lever L fulcrumed at or near its middle on a pivot L' attached to the lower end of the car door B at or near the middle thereof, as plainly shown in Figs. 1 and 4, and to the lever L is secured a hand lever N provided with a handle N' adapted to be taken hold of by the operator to impart a swinging motion to the said lever N to move the same from a vertical position downward into the inclined position shown in dotted lines in Fig. 1 or back to vertical position.

The free end of the hand lever N is adapted to engage either of two keepers O and O' bolted or otherwise fastened to the door B so as to lock the lever N in either the vertical or inclined positions shown in full and dotted lines in Fig. 1. Each keeper O is provided with shoulders O², O³ forming a recess between them for the reception of the lever N to hold the latter normally in locked position on the corresponding keeper O or O', it being understood that the lever N is sufficiently resilient to readily snap into the place between the lugs O², O³ when pushed over the lug O³ into the recess. The lug O² is preferably higher than the lug O³ and is provided with an aperture O⁴ for the passage of the wire of a seal P also passing through an aperture N² in the lever N to hold the latter sealed in the keeper O at the time the door B is in a closed position. It is understood that when the lever N is in a vertical position, as shown in full lines in Fig. 1, the wedges I are withdrawn from the wheels E to allow of sliding the door B into open, closed or partly closed position, as desired, and when the desired position is reached the operator takes hold of the handle N', and first pulls the lever N out of engagement with the keeper O and then swings the lever N downward into the inclined position shown in dotted lines in Fig. 1, whereby the lever L is turned and the links K move the wedges I away from each other and under the wheels E so as to slightly raise the door B and with it the hanger C to firmly engage the hook C³ with the track F thus locking the door B against movement. A washer L² is held on the pivot L' to space the lever N from the door B with a view to insure an easy swinging movement of the lever N on the pivot L'.

Having thus described our invention, we claim as new and desire to secure by Letters Patent:

1. The combination of a sliding door, a track for said door, hangers fastened to the door and provided with hooks adapted to engage the said track, wheels journaled on the said hangers and mounted to travel on the said track, and manually controlled wedges adapted to be forced between the wheels and the track to firmly engage the hanger hooks with the track.

2. The combination of a sliding door, a track for said door, hangers fastened to the lower end of the door and provided with depending hooks adapted to engage the under side of the said track, wheels journaled on the said hangers and mounted to travel on top of the said track, wedges adapted to pass between the wheels and the track to raise the door and to firmly engage the hanger hooks with the track, and a lever mechanism on the door and connected with the said wedges.

3. The combination of a sliding door, a track for said door, hangers fastened to the lower end of the door and provided with depending hooks adapted to engage the under side of the track, wheels journaled on the said hangers and mounted to travel on top of the said track, wedges adapted to pass between the wheels and the track to raise the door and to firmly engage the hanger hooks with the track, a lever mechanism on the door and having a crank connection with the said wedges to move the same in and out of engagement with the said wheels and track, and keepers on the said door for holding the said lever mechanism in an adjusted position.

4. The combination of a sliding door, a track for the said door, hangers fastened to the lower end of the door and provided with depending hooks adapted to engage the under side of the said track, wheels journaled on the said hangers and mounted to travel on top of the track, wedges adapted to pass between the wheels and the track to raise the door and to firmly engage the hanger hooks with the track, each wedge having an inclined slot, a bolt on the corresponding hanger and extending through the slot of the corresponding edge, a lever having a handle and fulcrumed on the door, and links connecting the ends of said lever with said wedges.

In testimony whereof we have signed our names to this specification in the presence of two subscribing witnesses.

HERMAN V. COOKINGHAM.
GEORGE O. PRICE.

Witnesses:
GERTRUDE F. PENDER,
WM. C. HANS.